US008036386B2

(12) United States Patent  
Katayama

(10) Patent No.: US 8,036,386 B2  
(45) Date of Patent: Oct. 11, 2011

(54) SYSTEM AND METHOD FOR PROVIDING ELECTRONIC TICKET, AND ELECTRONIC TICKET VENDING APPARATUS AND MOBILE TELEPHONE THEREFOR

(75) Inventor: Toru Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 1169 days.

(21) Appl. No.: 10/923,745

(22) Filed: Aug. 24, 2004

(65) Prior Publication Data

US 2005/0049975 A1    Mar. 3, 2005

(30) Foreign Application Priority Data

Sep. 3, 2003 (JP) ................................. 2003-310826

(51) Int. Cl.
*H04K 1/00* (2006.01)
(52) U.S. Cl. ........ 380/270; 713/161; 713/163; 713/192; 713/193; 726/4; 726/5; 726/9; 726/10; 726/21; 705/51
(58) Field of Classification Search .................. 380/270
See application file for complete search history.

(56) References Cited

U.S. PATENT DOCUMENTS

| 7,066,385 | B2 * | 6/2006 | Fukada et al. ............... 235/380 |
| 7,392,226 | B1 * | 6/2008 | Sasaki et al. ................. 705/64 |
| 2002/0023027 | A1 | 2/2002 | Simonds |
| 2002/0042729 | A1 * | 4/2002 | Yajima et al. ................... 705/5 |
| 2002/0060246 | A1 | 5/2002 | Gobburu et al. |
| 2003/0066883 | A1 | 4/2003 | Yu |
| 2003/0093695 | A1 * | 5/2003 | Dutta ........................... 713/201 |
| 2003/0154169 | A1 * | 8/2003 | Yanai ............................. 705/65 |

FOREIGN PATENT DOCUMENTS

| EP | 1 150 228 | 10/2001 |
| JP | 3070539 | 9/1997 |
| JP | 2000-185146 | 7/1999 |
| JP | 2000-113238 | 4/2000 |
| JP | 2002-189933 | 7/2002 |
| JP | 2002-351623 | 12/2002 |
| WO | WO03034409 | * 4/2003 |

OTHER PUBLICATIONS

European Search Report dated Nov. 17, 2004.
Japanese Office Action with English Translations.

* cited by examiner

*Primary Examiner* — Eleni Shiferaw
*Assistant Examiner* — Shewaye Gelagay
(74) *Attorney, Agent, or Firm* — Whitham Curtis Christofferson & Cook, PC

(57) ABSTRACT

An electronic ticket providing system capable of distributing and browsing the information relating to a ticket can be realized while maintaining the security and transferability of an IC card. The electronic ticket information is divided into formal ticket data and provisional ticket data. The formal ticket data includes authentication information for admission, ticket notation information, and authentication information for acquisition of information for a ticket owner. The provisional ticket data includes the ticket notation information, and authentication information for acquisition of information for a ticket purchase requester. The electronic ticket information is distributed from an electronic ticket vending server to a mobile telephone over a communications network. In the mobile telephone, the formal ticket data is stored in a removable storage medium such as an IC card, etc. having high security and transferability, and the provisional ticket data is stored in the internal memory. In the electronic ticket vending server, ticket related information is transmitted if it is confirmed that the provisional ticket data is stored according to the authentication information for acquisition of information for a ticket purchase requester in the provisional ticket data.

27 Claims, 8 Drawing Sheets

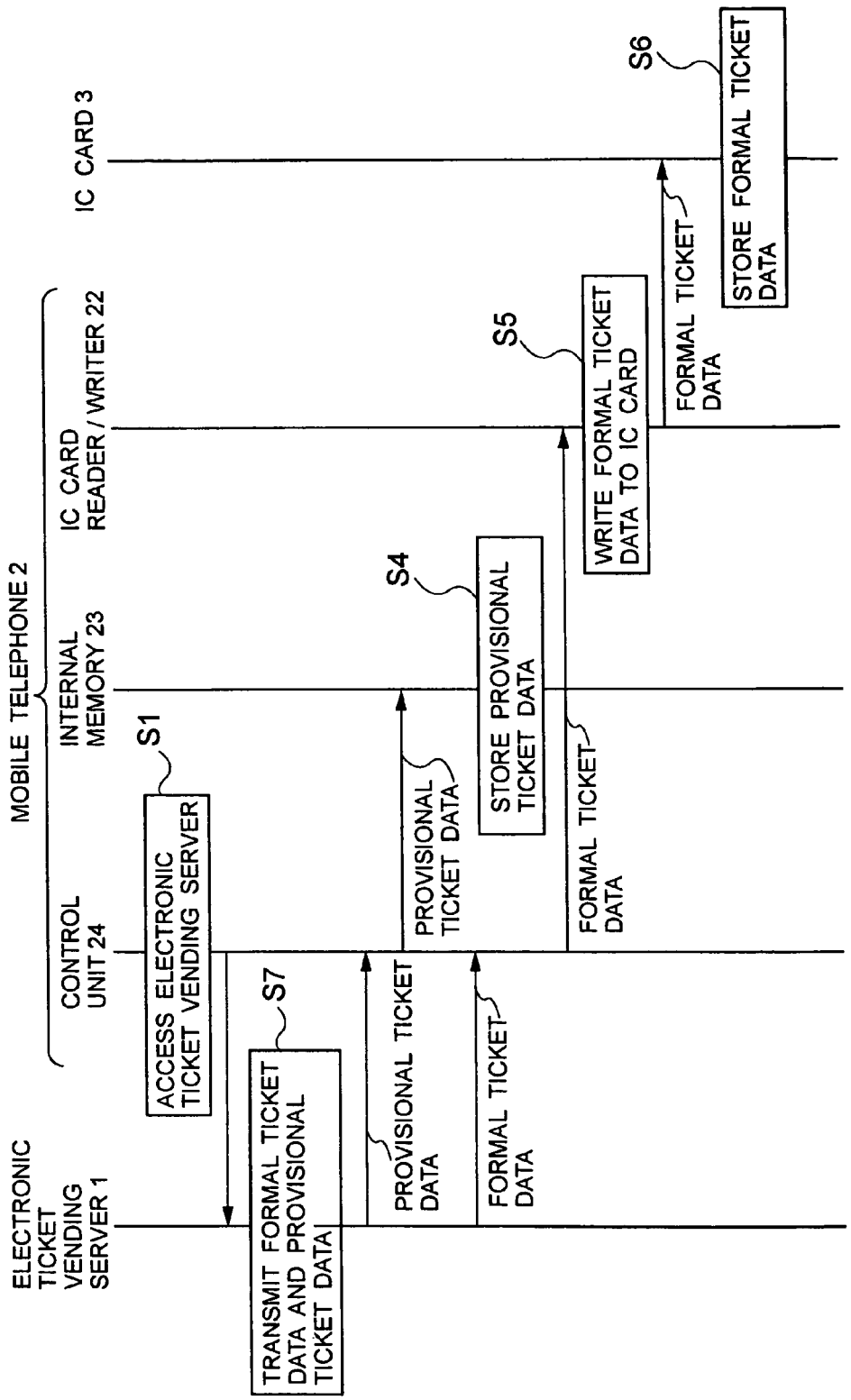

SYSTEM AND METHOD FOR PROVIDING ELECTRONIC TICKET, AND ELECTRONIC TICKET VENDING APPARATUS AND MOBILE TELEPHONE THEREFOR

BACKGROUND OF THE INVENTION

1. Field of the Invention

The present invention relates to an electronic ticket providing system and its method, an electronic ticket vending apparatus, a mobile telephone, and an operation program for use with them. In particular, the present invention relates to an electronic ticket providing system adapted to distribute electronic tickets to user's mobile telephone over a communications network.

2. Description of the Related Art

An electronic ticket system in which an IC card is used instead of a paper ticket when the ticket information is actually used has been proposed (refer to Japanese Patent Laid-Open No. 2000-113238, and Japanese Patent Laid-Open No. 2002-351623). In this system, the ticket information about admission and seat reservation for various events such as a concert, a play, etc., a boarding pass, a transportation ticket, etc. for transportation, etc. is electronically obtained on the IC card using a mobile telephone from the server of a ticket issuing center over a communications network. There is also a system proposed for storing ticket information on internal memory of a mobile telephone without an IC card (refer to Japanese Patent Laid-Open No. 2002-189933).

In the method for storing electronic ticket information on an IC card, it is possible to satisfy the security requirements against the tampering of data, copy of data, etc. However, if an electronic ticket is a ticket of an event, it is difficult to obtain various related information such as the traffic information to the event hall, the notification of related events, the refund information in case of cancel of the event, etc.

In the method for storing electronic ticket information on an IC card, it is possible to satisfy the security requirements against the tampering of data, copy of data, etc. However, if an electronic ticket is a ticket of an event, it is difficult to obtain various related information such as the traffic information to the event hall, the notification of related events, the refund information in case of cancelation of the event, etc.

Furthermore, there may be also a method for storing various related information together with electronic ticket information on an IC card. However, this method also has a disadvantage that the information cannot be checked unless an IC card and an IC card reader/writer are incorporated together.

SUMMARY OF THE INVENTION

The present invention aims at providing a method and a system and a mobile information processing terminal for use with the method and the system so that the security can be improved, various related information about an electronic ticket can be easily distributed to and browsed by a user.

The electronic ticket providing system according to the present invention provides electronic ticket information from an electronic ticket vending apparatus to a mobile telephone through a communications network. The electronic ticket vending apparatus includes: control means for controlling the distribution to a mobile telephone electronic ticket information containing: formal ticket data including authentication information for admission, a ticket notation information, and authentication information for acquisition of information for a ticket owner; and provisional ticket data including the ticket notation information and authentication information for acquisition of information for a ticket purchase requester. The mobile telephone includes: internal memory; means for reading on and writing to a removable storage medium; and storage control means for controlling the storage of the foimal ticket data in the storage medium and the provisional ticket data in the internal memory.

The electronic ticket providing method according to the present invention provides electronic ticket information from an electronic ticket vending apparatus to a mobile telephone through a communications network, and includes in the electronic ticket vending apparatus a control step of controlling the distribution to a mobile telephone electronic ticket information containing: formal ticket data including authentication information for admission, a ticket notation information, and authentication information for acquisition of information for a ticket owner; and provisional ticket data including the ticket notation information and authentication information for acquisition of information for a ticket purchase requester. The method also includes in the mobile telephone a storage control step of controlling the storage of the formal ticket data in the storage medium and the provisional ticket data in the internal memory.

The electronic ticket vending apparatus according to the present invention provides electronic ticket information to a mobile telephone through a communications network, and includes: control means for controlling the distribution to a mobile telephone electronic ticket information containing: formal ticket data including authentication information for admission, a ticket notation information, and authentication information for acquisition of information for a ticket owner; and provisional ticket data including the ticket notation information and authentication information for acquisition of information for a ticket purchase requester.

The mobile telephone according to the present invention receives electronic ticket information from an electronic ticket vending apparatus through a communications network, and includes: internal memory; means for reading from and writing to a removable storage medium; and storage control means for receiving from the electronic ticket vending apparatus electronic ticket information including: formal ticket data including authentication information for admission, a ticket notation information, and authentication information for acquisition of information for a ticket owner; and provisional ticket data including a ticket notation information and authentication information for acquisition of information for a ticket purchase requester, and controlling the storage of the formal ticket data in the storage medium, and the provisional ticket data in the internal memory.

The operation control program according to the present invention of the mobile telephone according to the present invention is used to direct a computer to perform operations of a mobile telephone which receives electronic ticket information from an electronic ticket vending apparatus through a communications network, and includes a storage control step of receiving from an electronic ticket vending apparatus electronic ticket information including: formal ticket data including authentication information for admission, a ticket notation information, and authentication information for acquisition of information for a ticket owner; and provisional ticket data including the ticket notation information and authentication information for acquisition of information for a ticket purchase requester, and controlling storage of the formal ticket data in a removable storage medium, and the provisional ticket data in internal memory.

The operation of the present invention is described below. In the present invention, the electronic ticket information is divided into formal ticket data and provisional ticket data. The formal ticket data includes authentication information for admission, a ticket notation information, and authentication information for acquisition of information for a ticket owner. The provisional ticket data includes the ticket notation information and authentication information for acquisition of information for a ticket purchase requester (does not include the authentication information for admission). The formal ticket data and the provisional ticket data are distributed from an electronic ticket vending server to a mobile telephone over a communications network. The mobile telephone stores the formal ticket data in a storage medium such as a removable IC card, etc. with high security, and stores the provisional ticket data in the internal memory.

When a user requests to know the information for the provisional ticket for a ticket purchase requester which is the event related information (traffic information for access to an event hall, related event information, etc.) about the ticket, the user accesses the electronic ticket vending server and the electronic ticket vending server checks according to the authentication information about the provisional ticket data whether or not the user has the provisional ticket data in the mobile telephone. If the authentication can be checked, the provisional ticket information is transmitted to the mobile telephone of the user. Thus, the ticket purchase requester can browse the information for the provisional ticket on the display unit of the mobile telephone by displaying the information on the display unit.

Furthermore, the information for the formal ticket such as wall paper on the display screen of the mobile telephone, mobile phone melody, etc. is transmitted as a premium to the owner of the formal ticket through the electronic ticket vending server so that the sale of the tickets can be promoted. In this case, it is necessary to check that the user has certainly acquired the formal ticket data. Therefore, the authentication information for acquisition of information for a ticket owner contained in the formal ticket data is used.

BRIEF DESCRIPTION OF THE DRAWINGS

FIG. 8 shows the operation sequence according to the first embodiment of the present invention.

DETAILED DESCRIPTION OF THE PREFERRED EMBODIMENTS

Figure 1:
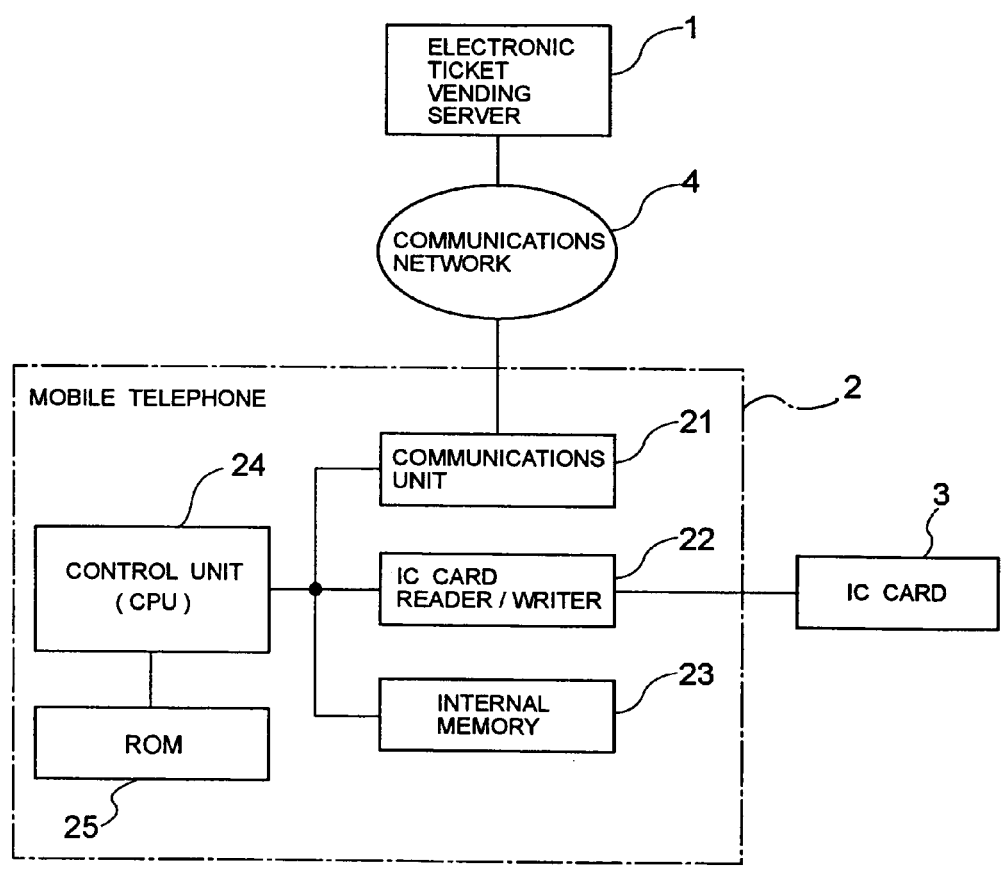
FIG. 1 shows the configuration of the system of the present invention.

The first embodiment of the present invention is described below by referring to the attached drawings. FIG. 1 is a block diagram of the system according to the first embodiment of the present invention. In FIG. 1, an electronic ticket vending server 1 for sales of an electronic ticket is connected to a mobile telephone 2 carried by a user over a communications network 4. The mobile telephone 2 has a removable IC card 3. The IC card 3 stores electronic ticket data.

Figure 2:
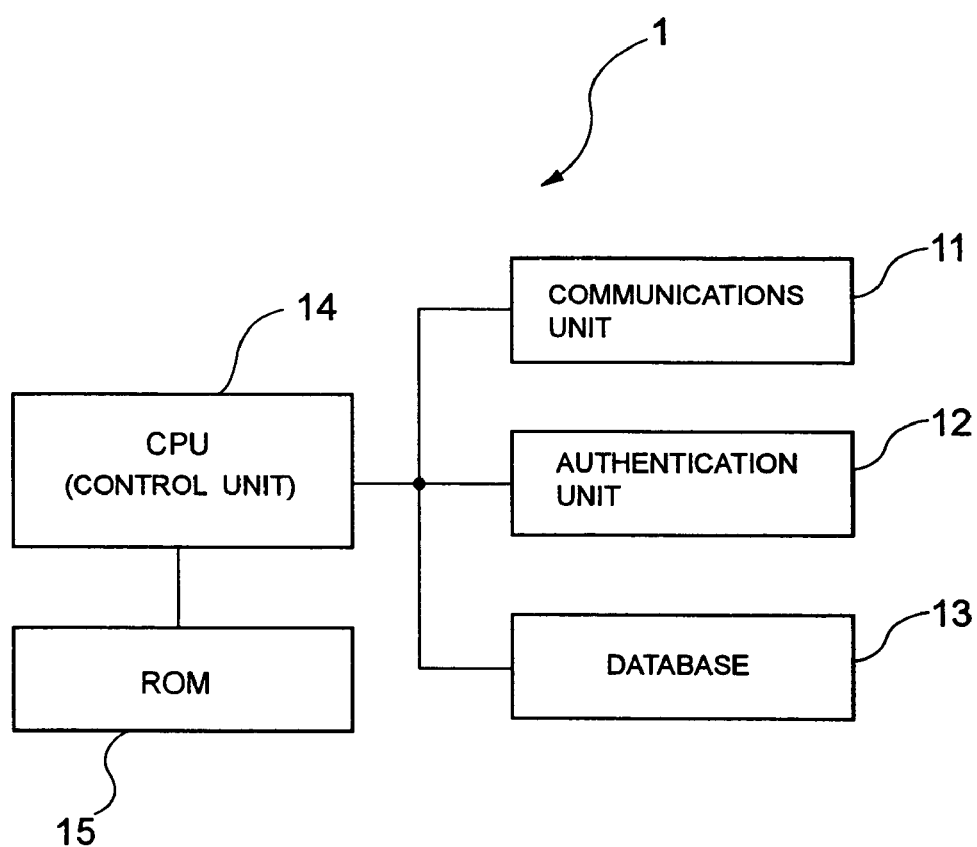
FIG. 2 shows the configuration of the electronic ticket vending server 1 shown in FIG. 1.

The mobile telephone 2 comprises: a communications unit 21 for communications with the electronic ticket vending server 1 over the communications network 4; an IC card reader/writer 22 for reading from and writing to the IC card 3; internal memory 23; a control unit (CPU) 24 for controlling these units; and ROM 25 storing the operations of the control unit 24 as a program in advance. As shown in FIG. 2, the electronic ticket vending server 1 comprises: a communications unit 11 for communications with the mobile telephone 2 over the communications network 4; an authentication unit 12 for performing various authentication processes; a database 13 storing various data; a control unit (CPU) 14 for controlling each unit; and ROM 15 storing the operations of the control unit 14 as a program in advance.

Figure 3:
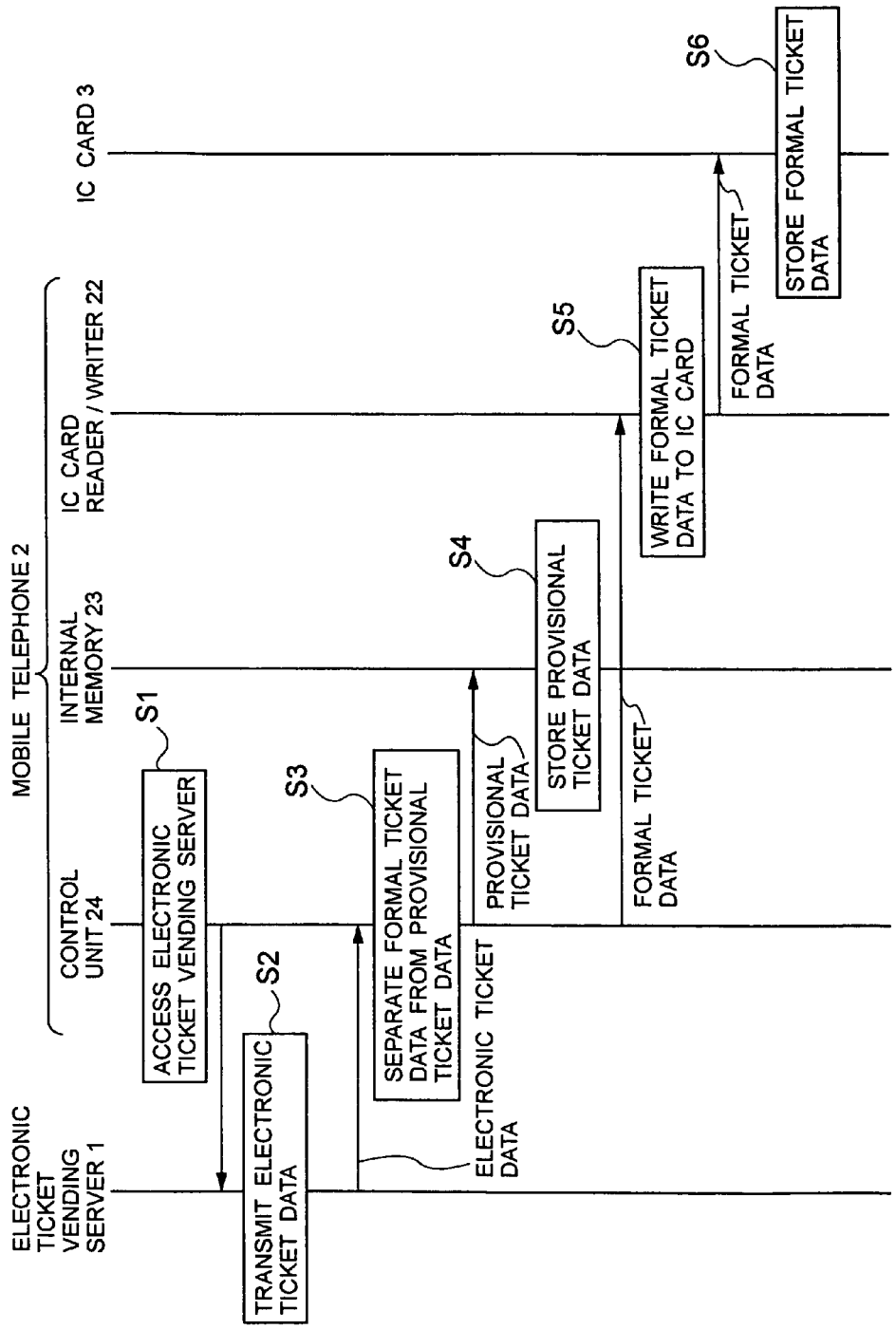
FIG. 3 shows the operation sequence according to the first embodiment of the present invention.
Figure 4:
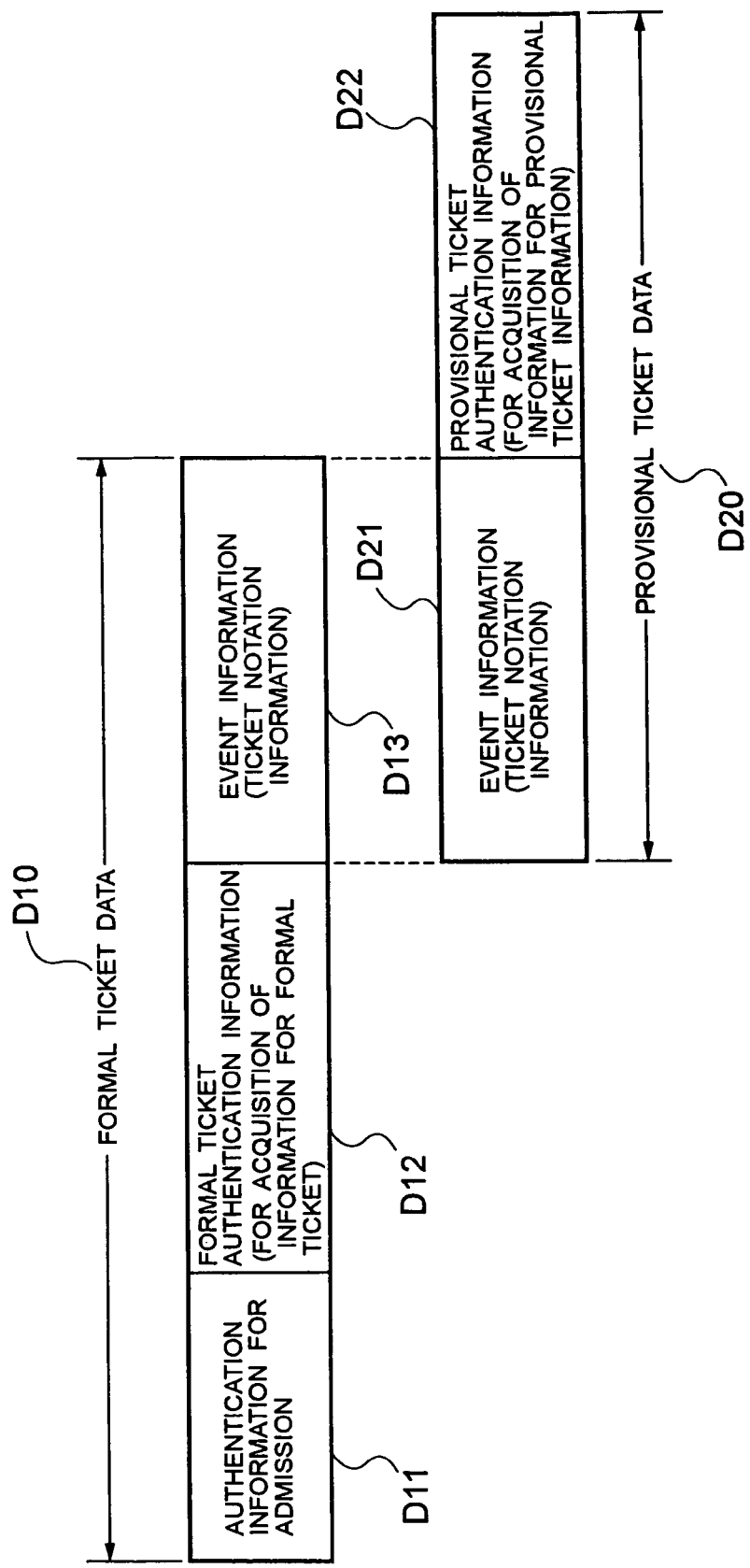
FIG. 4 shows an example of the electronic ticket information according to the present invention.

FIG. 3 shows the operation sequence of distributing an electronic ticket according to the first embodiment of the present invention. When the user obtains an electronic ticket, the user uses the mobile telephone 2 and accesses the electronic ticket vending server 1 (step S1), connects the mobile telephone 2 to the electronic ticket vending server 1, and performs operations according to the guide screen displayed on the display unit (not shown in the attached drawings) of the mobile telephone 2, thereby receiving a distributed desired electronic ticket (step S2). FIG. 4 shows the contents of the electronic ticket data from the electronic ticket vending server 1.

In FIG. 4, the electronic ticket information consists of formal ticket data D10 and provisional ticket data D20. The formal ticket data D10 consists of authentication information D11 for event admission, formal ticket authentication information D12 which is authentication information for acquisition of the information for the formal ticket, and event information D13 which is ticket notation information. The authentication information D11 for event admission is the information for authentication for admission in an event hall. When electronic authentication is performed, the information can be a ticket ID, a PIN (personal identification number, etc. In order to further enhance the security, a common key and a private/public key, etc. may be included. Other authentication information is similarly considered.

The formal ticket authentication information D12 is authentication information for acquisition of information for formal ticket, and the information for the formal ticket can be, for example, wallpaper information on the display screen of a mobile telephone, mobile phone melody information, etc. to provide a type of premium to a ticket owner. The formal ticket authentication information is the information for checking whether or not a ticket owner is to acquire such premium information The event information D13 is ticket notation information, and includes at least the date and time of an event to be held, the place to be held, a seat reservation number, which are described on each ticket.

The provisional ticket data D20 comprises the same event information D21 as the event information D13 of the formal ticket data D10, and provisional ticket authentication information D22 for acquisition of the information for the provisional ticket. Provisional ticket information refers to event related information such as the notification information about a coming event, etc., and is distribution information for not only a ticket owner but also a person who intends to purchase a ticket (a ticket purchase requester). Therefore, the provisional ticket authentication information D22 is the information for use in checking whether or not a person is to acquire information for provisional ticket.

In the mobile telephone 2, when the electronic ticket information is acquired, the control unit 24 separately stores the formal ticket data D10 and the provisional ticket data D20 (step S3), that is, the provisional ticket data D20 is stored in the internal memory 23 (step S4), and the formal ticket data D10 is stored in the IC card 3 through the IC card reader/writer 22 (steps S5 and S6).

Figure 5:
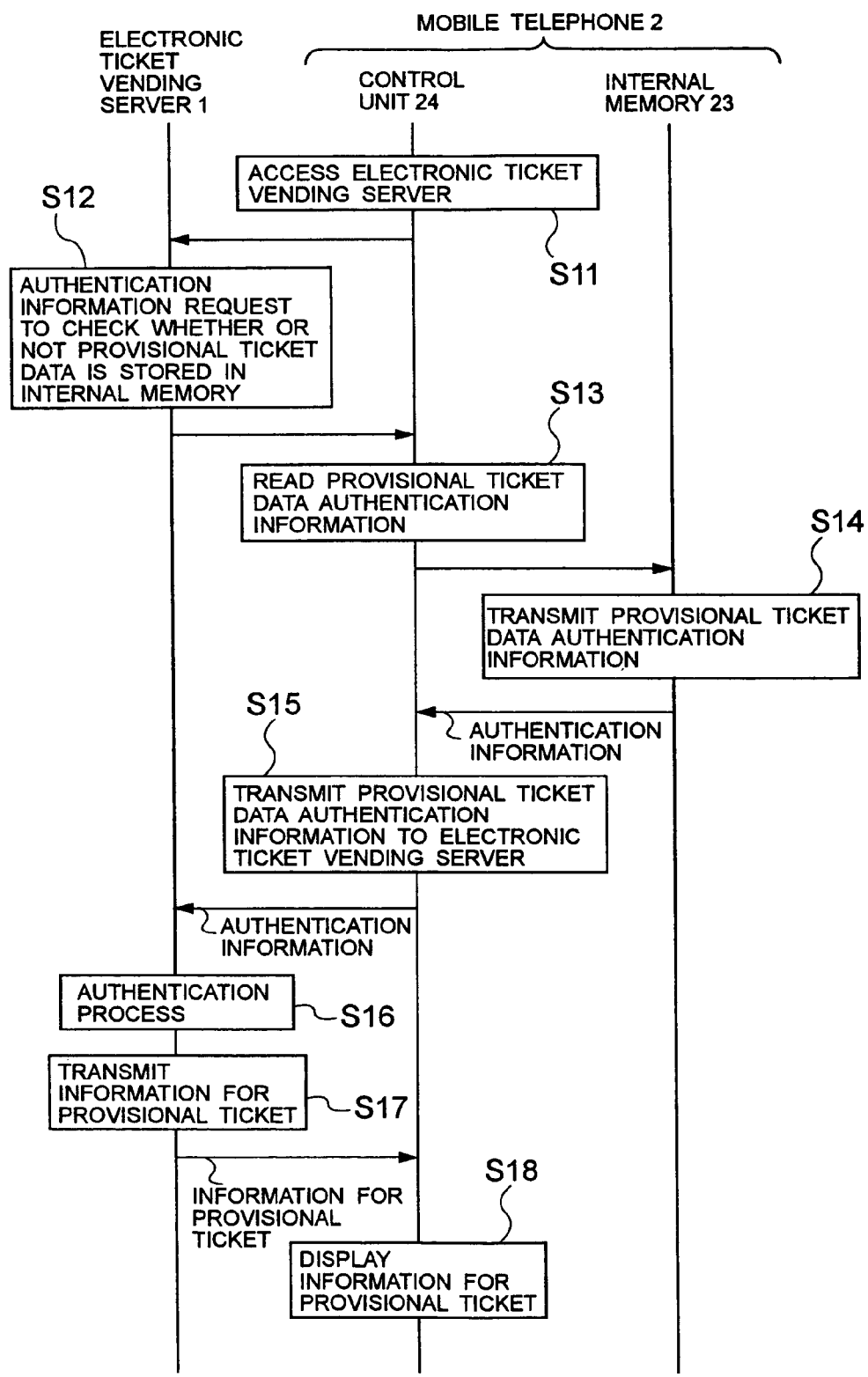
FIG. 5 shows the operation sequence of acquiring the distribution of the information for the provisional ticket according to an embodiment of the present invention.

FIG. 5 shows the operation sequence of distributing information for provisional ticket according to the present embodiment. When a user requests to acquire the information for the provisional ticket, the user uses the mobile telephone 2 and accesses the electronic ticket vending server 1 (step S11). In response to this, the electronic ticket vending server 1 requests the mobile telephone 2 to send the provisional ticket authentication information to check the storage of the provisional ticket data in the internal memory 23 of the mobile telephone 2 (step S12).

In response to the request, the control unit 24 of the mobile telephone 2 reads the authentication information about the provisional ticket data from the internal memory 23 (steps S13 and S14). The provisional ticket data authentication information read from the internal memory 23 is transmitted to the electronic ticket vending server 1 by the control unit 24 (step S15). The electronic ticket vending server 1 performs an authentication process using the provisional ticket authentication information (step S16). If the storage of the provisional ticket data is checked in this authentication process, the electronic ticket vending server 1 distributes the information for the provisional ticket to the mobile telephone 2 (step S17). The mobile telephone 2 receives the information for the provisional ticket, and displays it on the display unit (step S18), or stores it in the memory. In this case, the IC card 3 storing the formal ticket data is not required.

Figure 6:
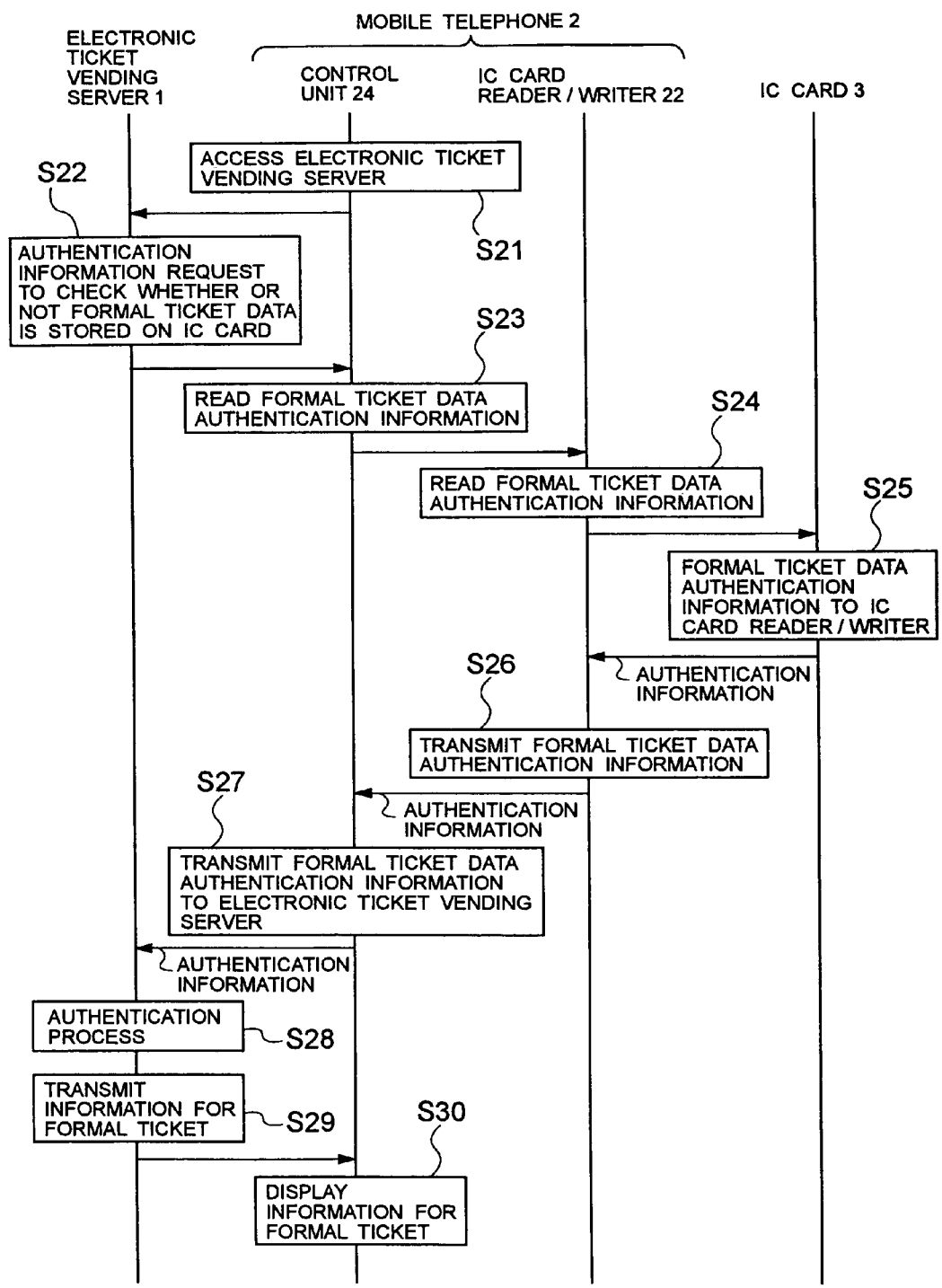
FIG. 6 shows the operation sequence of acquiring the distribution of the information for the formal ticket according to an embodiment of the present invention.

FIG. 6 shows the operation sequence of distributing the information for the formal ticket in the present embodiment. When the user having the formal ticket data in the IC card 3 acquires the information for the formal ticket data (premium information), the user accesses the electronic ticket vending server 1 using the mobile telephone 2 (step S21). In response to this, the electronic ticket vending server 1 requests the mobile telephone 2 to transmit the formal ticket authentication information to check the storage of the formal ticket data in the IC card 3 implemented in the mobile telephone 2 (step S22).

In response to this, the control unit 24 of the mobile telephone 2 requests the IC card reader/writer 22 to read the formal ticket data authentication information (step S23), the IC card reader/writer 22 reads the formal ticket data authentication information from the IC card, and the control unit 24 transmits the information to the electronic ticket vending server 1 (steps S24 to S27). The electronic ticket vending server 1 performs the authentication process according to the formal ticket authentication information (step S28). If the storage of the formal ticket data is confirmed in this authentication process, the electronic ticket vending server 1 distributes the information for the formal ticket to the mobile telephone 2 (step S29).

The mobile telephone 2 displays the information for the formal ticket on the display screen (step S30), or stores it in the memory. At this time, if the IC card 3 storing the formal ticket data is not implemented in the mobile telephone 2, the storage of the formal ticket data is not confirmed, and the information for the formal ticket is not transmitted from the electronic ticket vending server 1 to the mobile telephone 2.

Figure 7:
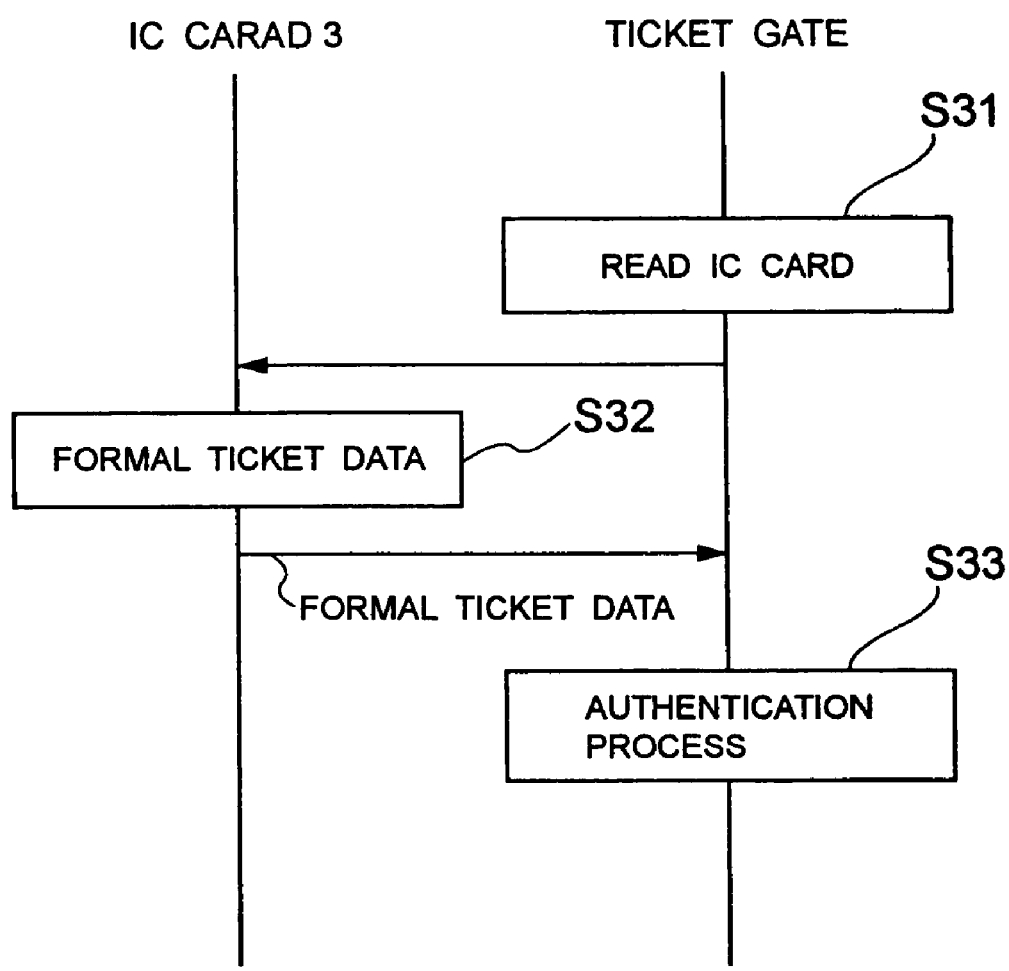
FIG. 7 shows the operation sequence at the gate of the electronic ticket according to an embodiment of the present invention.

FIG. 7 shows the operation sequence of using a formal ticket. A ticket gate not shown in FIG. 1 reads the formal ticket data stored in the IC card 3 (steps S31 and S32), and checks (authenticates) the data (step S33). The checking (authentication) process is performed according to the authentication information D11 (FIG. 4) for event admission of the formal ticket data D10. If admission is allowed by authenticating the formal ticket data, a user having the IC card 3 can receive a service defined by the formal ticket.

FIG. 8 shows the operation sequence according to the second embodiment of the present invention. The equivalent portions also shown in FIG. 3 are assigned the same reference numerals. In the above-mentioned first embodiment, the electronic ticket information shown in FIG. 4, that is, the formal ticket data D10 and the provisional ticket data D20, are collectively transmitted to the mobile telephone. However, in the present embodiment, the data is separately transmitted (step S7). In the mobile telephone 2, the data is stored in the internal memory 23 and the IC card 3 respectively (steps S4 to S6).

According to the present invention, the electronic ticket information can be divided into formal ticket data and provisional ticket data, the formal ticket data is stored in a high security storage medium such as an IC card, etc., and the provisional ticket data is stored in the internal memory of the mobile telephone, thereby maintaining the high security and transferability, and possibly confirming the ticket notation information with the provisional ticket data stored in the mobile telephone even without the formal ticket data, and possibly acquiring the information for the provisional ticket. Furthermore, as the information for the provisional ticket, the information can be defined as related event information (information about a next event, etc.) so that the sale of tickets can be promoted. Furthermore, a predetermined premium can be distributed to a ticket owner having the formal ticket data, thereby promoting the sales of the tickets.

What is claimed is:

1. An electronic ticket providing system, comprising an electronic ticket vending apparatus and a mobile telephone for providing electronic ticket information from the electronic ticket vending apparatus to the mobile telephone through a communications network, the system comprises:

control circuit, in the electronic ticket vending apparatus, for controlling distribution of electronic ticket information to the mobile telephone, wherein said electronic ticket information is divided into formal ticket data and provisional ticket data wherein said formal ticket data comprises event information, authentication information for admission, and formal ticket authentication information, and said provisional ticket data comprises the event information and provisional ticket authentication information;

and wherein the mobile telephone comprises:

internal memory;

Integrated Circuit (IC) card reader/writer for reading from and writing to a removable storage medium;

storage control circuit for controlling storage of the formal ticket data in the removable storage medium, and return of said formal ticket authentication information from said mobile to said electronic ticket vending apparatus, and controlling storage of the provisional ticket data in the internal memory, and return of said provisional ticket authentication information from said mobile telephone to said electronic ticket vending apparatus; and wherein the electronic ticket vending apparatus performs authentication confirming storage of the provisional ticket data in the internal memory of the mobile telephone in response to an acquisition request from the mobile telephone and permitting transmission of information of the provisional ticket to the mobile phone based on an authentication result.

2. The electronic ticket providing system according to claim 1, wherein: the control circuit of the electronic ticket vending apparatus is configured to collectively transmit the formal ticket data and the provisional ticket data as the electronic ticket information; and the storage control circuit of the mobile telephone is configured to separately store the formal ticket data and the provisional ticket data of the electronic ticket information.

3. The electronic ticket providing system according to claim 1, wherein the control circuit of the electronic ticket vending apparatus is configured to separately transmit the formal ticket data and the provisional ticket data.

4. The electronic ticket providing system according to claim 1, wherein the information transmitted by the electronic vending apparatus to the mobile telephone based on said authentication result is event information related to an event of the electronic ticket.

5. The electronic ticket providing system according to claim 1, wherein the electronic vending apparatus further performs authentication confirming formal ticket data stored in the removable storage medium of the mobile telephone and, based on an authentication result, permitting transmission of either wallpaper information or mobile phone melody information from said electronic vending apparatus to said mobile telephone.

6. An electronic ticket providing method for providing electronic ticket information from an electronic ticket vending apparatus to a mobile telephone through a communications network, the method comprises:

controlling, at the electronic ticket vending apparatus, distribution of electronic ticket information to the mobile telephone, the electronic ticket information being divided into formal ticket data and provisional ticket data wherein said formal ticket data comprises event information, authentication information for admission, and formal ticket authentication information, and said provisional ticket data comprises the event notation information and provisional ticket authentication information, and, controlling, at the mobile telephone, storage of the formal ticket data in a removable storage medium, and return of said formal ticket authentication information from said mobile telephone for acquisition of information for a ticket owner to said electronic ticket vending apparatus, and controlling, at the mobile telephone, storage of the provisional ticket data in the internal memory, and return of said provisional ticket authentication information from said mobile telephone for acquisition of information for a ticket purchase requester to said electronic ticket vending apparatus; and authenticating, at the electronic vending apparatus, confirming storage of the provisional ticket data in the internal memory for the mobile telephone in response to an acquisition request for from the mobile telephone and permitting transmission of information of the provisional ticket to the mobile telephone from the electronic vending apparatus based on an authentication result.

7. The electronic ticket providing method according to claim 6, wherein: the electronic ticket vending apparatus further collectively transmitting the formal ticket data and the provisional ticket data as the electronic ticket information; and the mobile telephone further separately storing the formal ticket data and the provisional ticket data of the electronic ticket information.

8. The electronic ticket providing method according to claim 6, wherein the electronic ticket vending apparatus further separately transmitting the formal ticket data and the provisional ticket data.

9. The electronic ticket providing method according to claim 6, wherein the information transmitted by the electronic vending apparatus to the mobile telephone based on said authentication result is event information related to an event of the electronic ticket.

10. The electronic ticket providing method according to claim 6, further comprising:

authenticating, at the electronic ticket vending apparatus, confirming storage of the formal ticket data in the removable storage medium of the mobile telephone in response to an acquisition request from the mobile telephone; and based on an authentication result transmitting the information to the mobile telephone.

11. The electronic ticket providing method according to claim 10, wherein the information includes at least one of wallpaper information which is displayed on a display screen of the mobile telephone and mobile phone melody information.

12. An electronic ticket vending apparatus for providing electronic ticket information to a mobile telephone through a communications network, comprising control circuit for controlling distribution of electronic ticket information to a mobile telephone, the electronic ticket information containing:

formal ticket data comprising event information authentication information for admission, and formal ticket authentication; and provisional ticket data comprising the event information and provisional ticket authentication information;

said control circuit being responsive to return of formal ticket authentication information from said mobile telephone for acquisition of information for a ticket owner for controlling distribution of formal ticket information to said mobile telephone, responsive to return of provisional ticket authentication information from said mobile telephone for controlling distribution of provisional ticket information to said mobile telephone, and confirming storage of the provisional ticket data in an internal memory for the mobile telephone in response to an acquisition request from the mobile telephone and permitting transmission of provisional ticket information to the mobile telephone based on an authentication result.

13. The electronic ticket vending apparatus according to claim 12, wherein the control circuit collectively transmits the formal ticket data and the provisional ticket data.

14. The electronic ticket vending apparatus according to claim 13, wherein the control circuit separately transmits the formal ticket data and the provisional ticket data.

15. The electronic ticket vending apparatus according to claim 12, wherein the provisional ticket information transmitted to the mobile telephone based on returned provisional ticket authentication information is event information related to an event of the electronic ticket.

16. The electronic ticket vending apparatus according to claim 12, wherein the electronic ticket vending apparatus further performs authentication confirming storage of the formal ticket data in the removable storage medium of the mobile telephone in response to an acquisition request and based on an authentication result the formal ticket information is transmitted to the mobile telephone.

17. The electronic ticket vending apparatus according to claim 16, wherein the formal ticket information includes at least one of wallpaper information which is displayed on a display screen of the mobile telephone and mobile phone melody information.

18. A mobile telephone for receiving electronic ticket information from an electronic ticket vending apparatus through a communications network, comprising:
   internal memory;
   IC card reader/writer for reading from and writing to a removable storage medium; and
   storage control circuit for receiving from the electronic ticket vending apparatus electronic ticket information including:
   formal ticket data comprising event information, authentication information for admission, and formal ticket authentication information; and
   provisional ticket data comprising the event notation information and provisional ticket authentication information, and
   wherein said storage control circuit controls storage of the formal ticket data in the removable storage medium, and return of formal ticket authentication information to said electronic ticket vending apparatus, and
   wherein said storage control circuit controls controlling storage of the provisional ticket data in the internal memory, and return of said provisional ticket authentication information for to said electronic ticket vending apparatus thereby enabling said electronic ticket vending apparatus to confirm storage of the provisional ticket data in the internal memory, and
   wherein said storage control circuit controls reception of provisional ticket information when transmitted from said electronic vending apparatus to said mobile telephone.

19. The mobile telephone according to claim 18, wherein the formal ticket data and provisional ticket data are collectively transmitted as the electronic ticket information, and the storage control circuit is configured to separately store the formal ticket data and the provisional ticket data of the electronic ticket information.

20. The mobile telephone according to claim 18, wherein said mobile telephone is configured to receive event information related to an event of the electronic ticket upon said electronic vending apparatus confirming storage of the provisional ticket data in the internal memory.

21. The mobile telephone according to claim 18, wherein said mobile telephone is configured to receive at least one of wallpaper information which is displayed on a display screen and mobile phone melody information upon said electronic vending apparatus confirming storage of the formal ticket data in said removable storage medium.

22. A computer program product stored on a non-transitory computer-readable storage medium that when executed by a processor causes the processor to perform the steps of
   receiving from an electronic ticket vending apparatus electronic ticket information including:
   formal ticket data comprising event information, authentication information for admission, and formal ticket authentication information; and
   provisional ticket data comprising the event information and provisional ticket authentication information,
   controlling storage of the formal ticket data in a removable storage medium, and controlling storage of the provisional ticket data in internal memory, and reading from said removable storage medium of said mobile telephone and transmitting formal ticket authentication information to the electronic vending apparatus,
   reading from said internal memory of said mobile telephone and transmitting provisional ticket authentication information to the electronic vending apparatus thereby enabling confirmation of storage of the provisional ticket data in the internal memory of the mobile telephone, and
   transmitting from said electronic vending apparatus provisional ticket information to said mobile telephone upon confirmation of provisional ticket data in the internal memory of the mobile telephone.

23. An electronic ticket providing system, comprising an electronic ticket vending apparatus and a mobile telephone for providing electronic ticket information from the electronic ticket vending apparatus to the mobile telephone through a communications network, the system comprises:
   control circuit, in the electronic ticket vending apparatus, for controlling distribution of electronic ticket information to the mobile telephone, wherein said electronic ticket information is divided into formal ticket data and provisional ticket data wherein
   said formal ticket data comprises event information, authentication information for admission, and formal ticket authentication information, and
   said provisional ticket data comprises the event information and provisional ticket authentication information;
   and wherein the mobile telephone comprises:
   internal memory;
   IC reader/writer for reading from and writing to a removable storage medium;
   storage control circuit for controlling storage of the formal ticket data in the removable storage medium, and return of said formal ticket authentication information from said mobile to said electronic ticket vending apparatus, and
   controlling storage the formal ticket data in the removable storage medium, and return of said formal ticket authentication information from said mobile telephone to said electronic vending apparatus, and
   controlling storage of the provisional ticket data in the internal memory and return of said provisional ticket authentication information from said mobile telephone to said electronic ticket vending apparatus; and
   wherein the electronic ticket vending apparatus performs authentication for confirming storage of the formal ticket data in the removable storage medium of the mobile telephone in response to an acquisition request from the mobile telephone and for permitting transmission of information of the formal ticket to the mobile telephone from the electronic vending apparatus based on an authentication result.

24. The electronic ticket providing system according to claim 23, wherein:
   the control circuit of the electronic ticket vending apparatus is configured to collectively transmit the formal ticket data and the provisional ticket data as the electronic ticket information; and
   the storage control circuit of the mobile telephone is configured to separately store the formal ticket data and the provisional ticket data of the electronic ticket information.

25. The electronic ticket providing system according to claim 23, wherein the control means of the electronic ticket vending apparatus is configured to separately transmit the formal ticket data and the provisional ticket data.

26. The electronic ticket providing system according to claim 23, wherein the electronic vending apparatus transmits event information related to an event of the electronic ticket to said mobile telephone on authenticating said provisional ticket data in said internal memory of said mobile telephone.

27. The electronic ticket providing system according to claim 23, wherein the information transmitted from the electronic vending apparatus to the mobile telephone based on said authentication results includes at least one of wallpaper information for display on a display screen of the mobile telephone and mobile phone melody information.

* * * * *